United States Patent [19]

Keller et al.

[11] Patent Number: 4,649,502

[45] Date of Patent: Mar. 10, 1987

[54] PROCESS AND APPARATUS FOR EVALUATING PRINTING QUALITY AND FOR REGULATING THE INK FEED CONTROLS IN AN OFFSET PRINTING MACHINE

[75] Inventors: Guido Keller, Zürich; Andreas Spiess, Kloten; Hans Ott; Rolf Boegli, both of Regensdorf, all of Switzerland

[73] Assignee: Gretag Aktiengesellschaft, Regensdorf, Switzerland

[21] Appl. No.: 665,974

[22] Filed: Oct. 29, 1984

[30] Foreign Application Priority Data

Nov. 4, 1983 [CH] Switzerland ........................ 5965/83
Dec. 27, 1983 [CH] Switzerland ........................ 6926/83

[51] Int. Cl.$^4$ ........................ G01N 21/88; G06M 5/00; B41M 1/00

[52] U.S. Cl. .................................... 364/519; 101/365; 356/402; 364/526; 364/551

[58] Field of Search ........................ 364/519, 551, 526; 101/365, 211; 356/402, 408, 425

[56] References Cited

U.S. PATENT DOCUMENTS

| | | | |
|---|---|---|---|
| 3,958,509 | 5/1976 | Murray et al. | 101/426 |
| 3,995,958 | 12/1976 | Pfahl et al. | 356/173 |
| 4,200,932 | 4/1980 | Schramm et al. | 364/519 |
| 4,217,648 | 8/1980 | Thurm et al. | 364/526 |
| 4,309,496 | 1/1982 | Miller | 430/30 |
| 4,390,958 | 6/1983 | Mamberer | 364/550 |
| 4,439,038 | 3/1984 | Mactaggart | 356/408 |
| 4,488,808 | 12/1984 | Kato | 356/73 |
| 4,494,875 | 1/1985 | Schramm et al. | 356/402 |
| 4,505,589 | 3/1985 | Ott et al. | 356/402 |
| 4,527,897 | 4/1985 | Okabe | 356/407 |
| 4,535,413 | 8/1985 | Shiota et al. | 364/526 |
| 4,539,647 | 9/1985 | Kaneko et al. | 364/551 |
| 4,541,336 | 9/1985 | Bernauer | 101/211 |
| 4,561,103 | 12/1985 | Horiguchi et al. | 382/1 |
| 4,586,148 | 4/1986 | Rehder et al. | 364/519 |

FOREIGN PATENT DOCUMENTS

| | | | |
|---|---|---|---|
| 0069572 | 5/1982 | European Pat. Off. . | |
| 0095648 | 5/1983 | European Pat. Off. . | |
| 0142470 | 5/1985 | European Pat. Off. | 101/365 |
| 2012213 | 4/1979 | United Kingdom | 101/365 |
| 2071573 | 9/1981 | United Kingdom | 101/365 |

OTHER PUBLICATIONS

"Zeitschrift fur Wissenschafliche Photographie Photophysik und Photochemie", by Hans E. J. Neugebauer--Charlottenburg, Band 36, Heft 4, Apr. 1937.

*Primary Examiner*—Felix D. Gruber
*Assistant Examiner*—Daniel W. Juffernbruch
*Attorney, Agent, or Firm*—Burns, Doane, Swecker & Mathis

[57] ABSTRACT

The printed sheets are scanned, by image elements, immediately behind the last printing mechanism, with one or several measuring heads. Suitable dimensions of an image element range from approximately $1\times1$ mm$^2$ to $10\times10$ mm$^2$. In each image element the reflectance is measured in four spectral ranges (infrared for black, red for cyan, green for magenta and blue for yellow). The measured reflectance values are converted by means of Neugebauer equations into surface coverages in a demasking step and inputted to a computer for evaluation. With the same measuring device, both the reference values associated with OK sheets, and the actual values associated with continuous printing, are measured. The computer compares the measured data, weights them with respect to such factors as surface coverage, foreign color component and the environment of a respective image element, and produces a regulating signal to control the ink feed elements. The color coordinates (X,Y,Z) may be determined from the surface coverage values of the four colors in a parallel computer program. Image elements which are important for the visual appearance of an image are given a high weight. A quality measure may be determined from the weighted comparison of reference and actual values to change the visual appearance. With this process it is possible to control the ink feed elements of a multicolor printing press by direct on-line measurement of the printed image, without using color measuring strips.

42 Claims, 2 Drawing Figures

PROCESS AND APPARATUS FOR EVALUATING PRINTING QUALITY AND FOR REGULATING THE INK FEED CONTROLS IN AN OFFSET PRINTING MACHINE

BACKGROUND OF THE INVENTION

The present invention relates to a process and an apparatus for evaluating printing quality and for regulating ink feed controls in an offset printing machine, in which the printed products as well as a reference are measured photoelectrically, by image element, and in which the comparison, by image elements, of the printed products to the reference is the basis for the determination of a quality measure and of setting values for the ink feed control elements. The present invention also relates to an offset printing machine having a device for automatically regulating ink feed control elements, which machine utilizes the apparatus of the present invention.

The evaluation of print quality and regulation of ink feed controls is usually effected by means of standardized color control strips. These control strips, printed together with the job, are evaluated densitometrically and the ink feed controls of the printing machine adjusted or set accordingly. The measurement of the color control strips may take place on the printing machine while it is running by means of so-called machine densitometers, or off-line, for example by automatic scanning densitometers, with the control circurt to the ink dosing elements either being open (quality evaluation) or closed (machine control), in both cases. A representative example of a computer-controlled printing machine with a closed control circuit is described in U.S. Pat. No. 4,200,932, among others.

In actual practice, for example for reasons of format, the use of a color control strip is frequently not possible. In such cases quality is usually evaluated visually by manual means.

U.S. Pat. No. 3,376,426 describes a multicolor printing machine regulated by means of a machine densitometer which operates without color measuring strips. In this printing machine the individual printed sheets are scanned point by point, the diffuse reflectance values are converted to densities (logarithmized) and the color densities are transformed in a nonlinear demasking operation into analytical color densities. These analytical color densities are compared directly with the analytical color densities of an "OK sheet", which were previously obtained in the same manner, and then stored. From the results of this comparison, a signal is obtained for each printing ink indicating the respective deviations of ink feed controls from the desired settings, whereby the ink dosage is then adjusted. This system, as described in U.S. Pat. No. 3,376,426, has not been found to be practical. This is probably due to the fact that secondary absorptions and the effect of overprinting are not adequately taken into account.

More recently, a system has been disclosed (for example U.S. Pat. No. 4,561,103) which makes possible the machine evaluation of printed products without using color control strips. In this system, the printed products are scanned photoelectrically over the entire image surface area on the printing machine while it is running by means of a machine densitometer, by image elements. The scanned values obtained from the individual image elements are compared (optionally, following special processing) with the similarly-processed scanned values of a reference product ("OK" sheets). From the results of the comparison, a quality decision of "good" or "poor" is reached using certain decision criteria. The decision criteria include such factors as the number of image elements differing by more than a certain tolerance from the corresponding image elements of the reference, the differences summed over selected image areas of the scanned values with respect to the corresponding scanned values of the reference, and the differences summed over certain scanning tracks of the scanned values from the corresponding values of the reference.

This system represents a certain amount of progress but is capable of improvement in several areas.

This patent is copending with related U.S. application Ser. Nos. 665,975 and 665,976, both filed Oct. 29, 1984.

OBJECTS AND BRIEF SUMMARY OF THE INVENTION

An object of the present invention is to provide a system for machine evaluation of the quality of printed products and for the corresponding regulation of printing machine ink feed controls, and which has improved accuracy and reliability over conventional systems.

Briefly, a process according to the present invention includes the steps of: dividing a reference for the individual printing colors into a plurality of image elements, and for each image element, determining the reference surface coverages for the individual printing colors, the reference being in the form of at least one of a printing plate upon which the printing process is based and a printed product which has previously been determined to be satisfactory, assigning to each image element, for each printing color, a weighting factor indicating a measure of the assurance with which the prevailing surface coverage may be determined, dividing the printed product into image elements in the same manner as is the reference, measuring the reflectance for each printed product image element, calculating the actual surface coverage for each of the printing colors from the respective reflectance, determining, for each image element and the individual printing colors, deviations of the actual surface coverages from the reference coverages, weighting the deviations with the assigned weighting factors, and determining at least one of the quality measure, and the setting values for the ink feed control elements, from said weighted deviations.

Other objects and advantages of the present invention can be recognized by a reference to the appended claims.

BRIEF DESCRIPTION OF THE DRAWINGS

The present invention will become more apparent to one skilled in the art to which it pertains from the following detailed description when read with reference to the drawings, in which.

DETAILED DESCRIPTION

Figure 1:
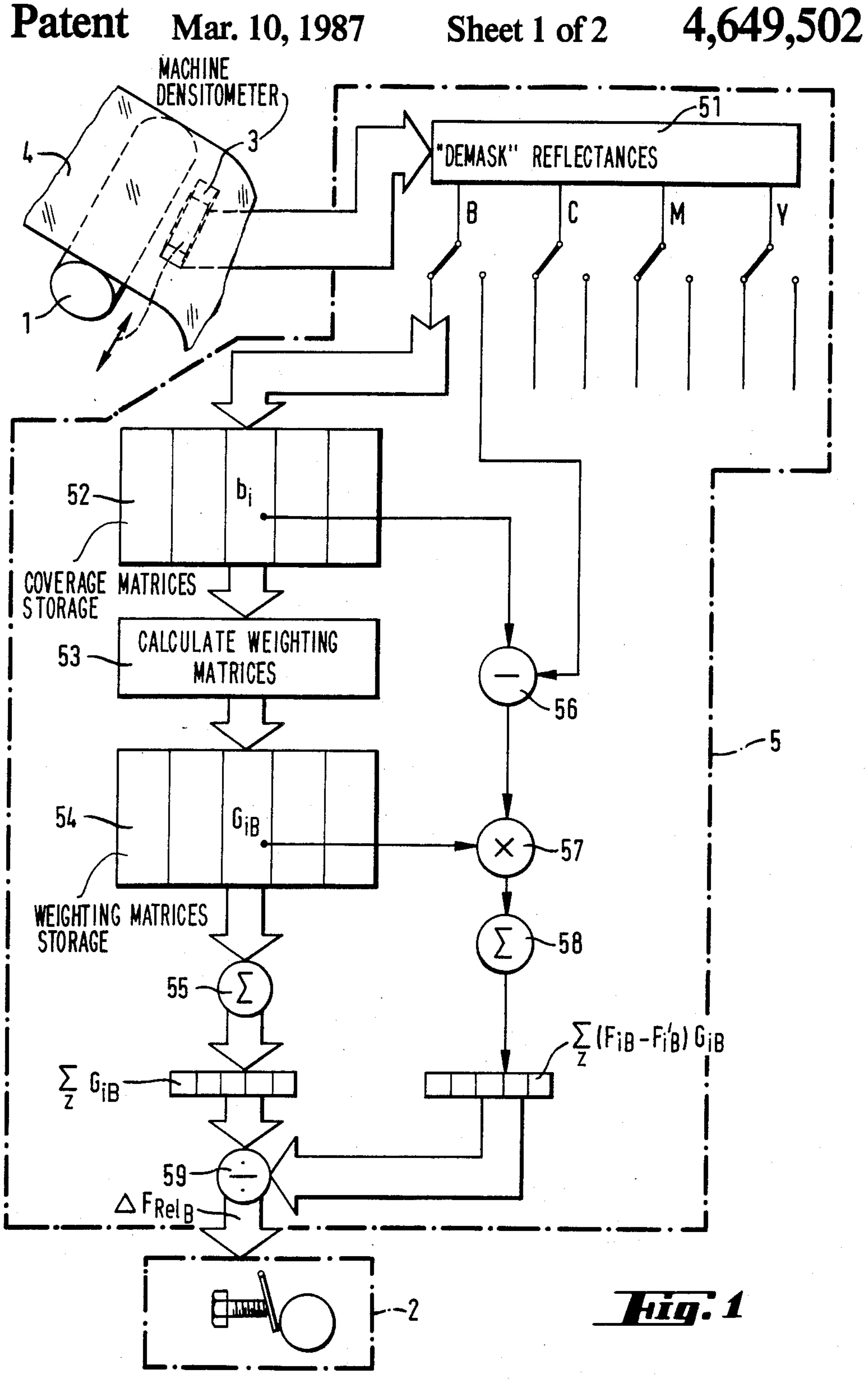
FIG. 1 is a simplified schematic diagram of an offset printing machine equipped according to one embodiment of the present invention.

As far as the conventional portions of the printing machine are concerned, FIG. 1 illustrates just the last printing unit 1 and the ink feed control elements 2. A conventional machine densitometer 3 at the printing units scans the printed sheets 4 photoelectrically. Attached to the printing machine is an electronic system in the form of a process computer 5, which controls all of the functional processes of the machine densitometer and evaluates the reflectance data produced by it. The result of this evaluation is in the form of control values or signals, which regulate the ink feed control elements 2 of the printing machine. The process computer is also capable of processing the measured data into quality measures for evaluating printing quality, in lieu of, or in addition to, generating the control signals. The principal differences between the layout described so far and the known devices of the references cited above are to be found primarily in the detection and processing of measuring data.

The photoelectric measurement of the individual printed products is effected by image elements, i.e., the printed sheets are divided into image elements and the reflectance is determined for each of these elements in four spectral ranges (infrared for black, red for cyan, green for magenta and blue for yellow). The dimensions of the image elements range from approximately $0.5 \times 0.5$ mm$^2$ to approximately $20 \times 20$ mm$^2$, preferably about $1 \times 1$ mm$^2$ to $10 \times 10$ mm$^2$. It is not necessary for the reflectance values to originate in the same printed sheet; rather, the determination of reflectance may be distributed over several printed sheets, inasmuch as less equipment is required. Examples of suitable machine densitometers whereby printed products may be scanned by image elements in this manner are disclosed in U.S. Pat. Nos. 2,968,988; 3,376,426; 3,835,777; 3,890,048; and 4,003,660, among others.

According to one important aspect of the present invention, the measured reflectances are not converted into density values, but are "demasked" immediately; i.e., the corresponding surface coverages are calculated from the four reflectances of each image element for the respective printing colors. This calculation is performed in a manner explained in more detail hereinbelow, by solving Neugebauer equations. The step of demasking the reflectances is indicated in FIG. 1 by the box labeled "51" within the process computer 5.

In FIG. 1, further processing of the measured data as indicated is shown for only one printing color, namely black. The steps of measuring and processing the data relating to the other printing colors is effected in a manner analogous to those performed for black.

After the printing process is adjusted correctly by hand, the printer gives his OK for continuous printing. The printed sheets produced up to this point, and immediately afterwards, may be used as references (OK sheets). This reference (in the form of a single sheet or of several successive sheets) is now measured, by image elements, and is demasked. Again referring to FIG. 1, the surface coverages calculated for all of the image elements, known hereinafter as the "reference surface coverages", are stored in four surface coverage matrices 52, each matrix being assigned to one of the print colors. Based on these surface coverages, four weighting matrices, each assigned to a print color, are further calculated (Block 53) and stored (Block 54). Each image element is thus assigned a weighting factor indicating the degree of assurance whereby the surface coverage of a particular color may be determined for the image element concerned. The weighting factors are discussed in more detail below.

The ink feed controls of the printing machine are divided into zones, which are also defined by a plurality of image elements. The weighting factors therefore correlate with those pertaining to a zone, as summed in Block 55. A total weight is thus obtained for each zone and printing ink, representing a measure of the assurance with which the prevailing surface coverage may be determined, and making it possible to measure the effect or impact of a change in ink feed controls upon that zone.

It is necessary to calculate the weighting matrices and the corresponding zonal total weights only once. In order to evaluate the print quality and/or to regulate the ink dosage, sheets from the continuous printing operation are measured from time to time in the same manner as is the reference (OK sheet), and are then compared with the reference.

As shown in FIG. 1, after demasking, the surface coverages obtained from the reflectances of the continuous printing operation (actual surface coverages) are compared element by element with the corresponding reference surface coverage in a subtraction stage 56, and the deviations from the reference surface coverages are weighted with associated weighting factors stored in the weighting matrices 54, by multiplier 57. The weighted deviations are summed for each printing color per zone in a summer 58, and the zonal sums formulated in this manner are finally standardized by division by the associated zonal total weight in divider 59. The result of these steps, performed by print zone and printing ink, is a weighted, standardized zonal deviation expressing the relative color deviation in the printing zone during the printing process which may then be used as a signal for adjusting the associated ink feed control element 2. The comparison of the respective reference and actual surface coverages is preferably effected online, to make it unnecessary to store the individual measured values during continuous printing.

The deviations in the surface coverages may be converted into deviations in the color coordinates (X, Y, Z) of the color space, either concurrently or successively in relation to the evaluation steps described above. The color coordinates may be determined from the surface coverage values of the four colors in a parallel computer program. Different weights corresponding to the importance of the image may be assigned to the individual image elements, thereby weighting the color coordinate deviations. In this manner, changes in the visual appearance of the printed image, and its respective quality measure, may be determined.

The formation of the standardized zonal deviations to be used as regulating values for the ink feed control elements may be represented by the following formulas:

$$\Delta F_{rel,j} = \frac{\sum_{z} (F_{i,j} - F'_{i,j}) \cdot G_{i,j}}{\sum_{z} G_{i,j}}$$

wherein:

$F_{i,j}$, $F'_{i,j}$: are the surface coverages of the image element i with respect to the color j for reference and for continuous printing, respectively.

$G_{i,j}$: the weighting factor of the image element i with respect to the color j.

$\Sigma$: summation over all of the image elements i of a zone.

$\Delta F_{rel,j}$: the standardized zonal deviation of the surface coverage of the color j.

The demasking operation and formation of the weighting factors shall be explained in more detail hereinafter.

The spectral progression of the printing colors is not ideal. For this reason, in photoelectrical measurements the mutual effects of secondary absorptions must be suppressed to the extent possible. The effect of the individual color components, and the statistics of overprinting as a function of the surface coverage of individual printing inks are described by the so-called Neugebauer equations (see for example the article, "The Theoretical Foundations of Multicolor Book Printing", in "Zeitschrift fur wissenschaftliche Photographie, Photophysik und Photochemie", Vol. 36, No. 4, April, 1937). Extended to four colors, where J=infrared, red, green and blue, these Neugebauer equations are:

$$\begin{aligned}\beta_j = {} & (1-b)\cdot(1-c)\cdot(1-m)\cdot(1-y)\cdot W_j + \\ & b\cdot(1-c)\cdot(1-m)\cdot(1-y)\cdot B_j + \\ & c\cdot(1-b)\cdot(1-m)\cdot(1-y)\cdot C_j + \\ & m\cdot(1-b)\cdot(1-c)\cdot(1-y)\cdot M_j + \\ & y\cdot(1-b)\cdot(1-c)\cdot(1-m)\cdot Y_j + \\ & b\cdot c\cdot(1-m)\cdot(1-y)\cdot BC_j + \\ & b\cdot m\cdot(1-c)\cdot(1-m)\cdot BM_j + \\ & b\cdot y\cdot(1-c)\cdot(1-m)\cdot BY_j + \\ & c\cdot m\cdot(1-b)\cdot(1-y)\cdot B1_j + \\ & c\cdot y\cdot(1-b)\cdot(1-m)\cdot G_j + \\ & m\cdot y\cdot(1-b)\cdot(1-c)\cdot R_j + \\ & b\cdot c\cdot m\cdot(1-y)\cdot BB1_j + \\ & b\cdot c\cdot y\cdot(1-m)\cdot BG_j + \\ & b\cdot m\cdot y\cdot(1-c)\cdot BR_j + \\ & c\cdot m\cdot y\cdot(1-b)\cdot N_j + \\ & b\cdot c\cdot m\cdot BN_j\end{aligned}$$

wherein:

$\beta_j$: reflectances measured with a filter of color j $W_j$: white reflectance with filter j $B_j$, $C_j$, $M_j$, $Y_j$: reflectance of full tone black, cyan, magenta, yellow measured with filter j $BC_j$, $BM_j$, $BY_j$, $Bl_j$ $G_j$, $R_j$: reflectance of full tone overprinting B+C, B+M, B+Y, C+M (blue), C+Y (green), M+Y (red) measured with filter j $BBl_j$, $BG_j$, $BR_j$, $N_j$: reflectance of full tone overprinting of B+C+M, B+C+Y, B+M+Y, C+M+Y (black) measured with filter j $BN_j$: reflectance of full tone overprinting B+C+M+Y measured with filter j b, c, m, y: surface coverages of the printing colors B, C, M, Y $B_j$—$BN_j$ are constants, depending on the printing sequence and the full tone density. Their values may be measured empirically from corresponding color tables. For the printing sequence B, C, M, Y they were determined, for example for a full tone density of approximately 1.5, as follows:

| | Infrared (black) | Red (cyan) | Green (magenta) | Blue (yellow) |
|---|---|---|---|---|
| W | 1.00 | 1.00 | 1.00 | 1.00 |
| B | 0.03 | 0.03 | 0.03 | 0.03 |
| C | 1.00 | 0.03 | 0.35 | 0.70 |
| M | 1.00 | 0.85 | 0.02 | 0.12 |
| Y | 1.00 | 0.98 | 0.76 | 0.02 |
| BC | 0.03 | 0.00 | 0.01 | 0.02 |
| BM | 0.03 | 0.03 | 0.00 | 0.01 |
| BY | 0.03 | 0.03 | 0.03 | 0.00 |
| B1 | 1.00 | 0.02 | 0.03 | 0.17 |
| G | 1.00 | 0.02 | 0.29 | 0.05 |
| R | 1.00 | 0.84 | 0.02 | 0.01 |
| BB1 | 0.03 | 0.00 | 0.00 | 0.01 |
| BG | 0.03 | 0.00 | 0.01 | 0.00 |
| BR | 0.03 | 0.03 | 0.00 | 0.00 |
| N | 1.00 | 0.02 | 0.02 | 0.02 |
| BN | 0.03 | 0.00 | 0.00 | 0.00 |

For full tone densities D in the range of 1 to 2, these values are within a narrow range of $X^{0.6}$ to $X^{1.3}$, if X is the tabulated value.

The aforelisted Neugebauer equations, wherein $\beta_j$ are the measured reflectances, are resolved iteratively for the unknown surface coverages b, c, m, y. It is assumed that $F=1-\beta$ has been satisfied with sufficient accuracy (F=surface coverage (b, c, m, y), $\beta$=reflectance). Based on their mutual effects, the most suitable sequence for iteration is magenta, yellow, cyan, black.

The assurance with which the deviations of the surface coverages of a particular element may be determined depends upon several parameters. One such parameter is "point increment." The point increment has the strongest effect on increased full tone density when surface coverage is in the approximate range of 50–70%. Intermediate surface coverages must therefore be weighted more heavily than either large or small surface coverages. A second parameter pertains to the surface environment, or the portions surrounding a particular element. In a quiet environment (homogeneous surface coverage), erroneous positioning plays a lesser role than it does in an agitated environment (non-homogeneous surface coverage). A third factor pertains to the effect of "foreign" colors. If at the same point several colors are printed together, an individual color may be isolated, resulting in lesser accuracy. In order to take these factors into account, for every image element and/or printing color, three partial weights are defined: a partial weight $G_1$ dependent on surface coverage; a partial weight $G_2$ dependent on the environment; and a partial weight $G_3$ dependent on foreign colors. The three partial weights are multiplied with each other and together result in the aforementioned weighting factor for each image element and printing color. The individual partial weights may further be weighted differentially, in combination, to form the weighting factor, which may be expressed as follows:

$$G_{i,j}=[G_{1i,j}]^{g1}\cdot[G_{2i,j}]^{g2}\cdot[G_{3i,j}]^{g3}$$

wherein $g_1-g_3$ are the effective weights of the three partial weights. These effective weights are within the range of 0 to 1. Usually, $G_1$ has the strongest and $G_2$ has the weakest effective weight.

For special printing masters it is conceivable to introduce a fourth weight $G_4$ which permits certain areas of the printed sheet to be weighted stronger or weaker. For example, $G_4$ may be used to suppress the evaluation of a printed text. The printer operator may introduce both the areas and $G_4$ into the system of the present invention interactively through a computer terminal.

The effect of deviations in ink feed controls is strongest when the surface coverage ranges from approximately 50 to 70%. Deviations may therefore be detected with a higher assurance in cases of medium surface coverages. Accordingly, the partial weight $G_1$, which is dependent on surface coverage, is selected so that it is at a maximum at medium surface coverages, and declines with either smaller or greater surface coverages. Suitable expressions of partial weight $G_1$ as a function of surface coverage include, for example, those defining parabolas, triangles, and trapezoids, wherein the maximum value 1 of the partial weight occurs in each case at or around a surface coverage of 50%. Non-symmetrical expressions, which involve higher surface configurations, are also possible. Certain examples of partial weight distributions may be expressed by the following formulas:

$$G_1(F)=1-4\cdot(F-0.5)^2 \quad \text{(parabola)}$$

$$G_1(F)=1-2\cdot(F-0.5) \quad \text{(triangle)}$$

$$G_1(F)=\text{Min }(a(1-|2(F-0.5)|),1)\ 1<a<2 \quad \text{(trapezoid)}$$

The indices i, j for the image elements and printing colors are eliminated in these formulas for the sake of simplicity.

The more homogeneous the surface coverage is in the vicinity of an image element, the less sensitive the measured value is to false positioning, an effect pertaining to the edges of the elements. Edges are best determined by means of differentiation. Steep or sharp edges yield high values, which correspond in turn to small weights. A Laplace operator of the following general type is particularly suitable as a simple differential operator in the image element environment comprising 3×3 image elements:

| | | | |
|---|---|---|---|
| a | b | a | with 4a + 4b + c = ⊖ |
| b | c | b | |
| a | b | a | |

The application of this operator signifies that the surface coverage of the image element concerned (one for each of the printing colors) is weighted with the factor c, and the surface coverages of the surrounding image elements with the factors a and b, respectively. The sum of the nine surface coverages weighted in this manner corresponds to the derivation of the surface coverage of the image element involved.

In actual practice, the Laplace operator may have the following form:

| | | |
|---|---|---|
| 0 | 1 | 0 |
| 1 | -4 | 1 |
| 0 | 1 | 0 |

For finer graduations the environment considered may be enlarged arbitrarily. The diagonal coefficients may also be taken into account (≠0).

The environment-dependent partial weight $G_2$ (for each image element and for each printing color) is calculated by the following formula:

$$G_2=\frac{1}{|c|}\cdot(|c|-|L|), \text{ or specifically } G_2=0.25\cdot(4-|L|)$$

wherein |L| is the result of the Laplace operator applied to the image element and its environment in keeping with the above, and c is the center element of the Laplace operator.

The smaller the surface coverage of three colors, the more accurately the surface coverage of the fourth color may be determined. Not every color has the same effect on the measurement of the others. For this reason, for each color or filter, respectively, separate effect coefficients must be taken into consideration. The partial weight $G_3$ is then obtained as the product of the reflectance values of the "foreign" color components raised to the power of the corresponding effect coefficient:

$$G_{3j}=(\beta_B)^{a_{j,1}}\cdot(\beta_C)^{a_{j,2}}\cdot(\beta_M)^{a_{j,3}}\cdot(\beta_Y)^{a_{j,4}}$$

Here, $\beta_B$, $\beta_C$, $\beta_M$ and $\beta_Y$ are the reflectances of the colors B, C, M and Y, respectively, and $a_{j1}$ to $a_{j4}$ are the aforementioned effect coefficients. The index j identifies the printing color for which the partial weight is valid. For j=B, C, M and Y these coefficients may be represented in a matrix:

| | |
|---|---|
| $a_{B1}$ ... | $a_{B4}$ |
| . | . |
| . | . |
| $a_{Y1}$ ... | $a_{Y4}$ |

Practical values of the effect coefficients are for example the following:

| | | | |
|---|---|---|---|
| 0 | 0 | 0 | 0 |
| 1 | 0 | 0.4 | 0 |
| 1 | 0.3 | 0 | 0.07 |
| 1 | 0.09 | 0.56 | 0 |

The coefficiente are dependent on the spectral configuration of the individual colors. Its scatter range is approximately as follows:

| | |
|---|---|
| $a_{B1}$, $a_{C2}$, $a_{M3}$, $a_{Y4}$ | 0 |
| $a_{B2}$, $a_{B3}$, $a_{B4}$ | 0 . . . 0.1 |
| $a_{C3}$, $a_{C4}$, $a_{M4}$, $a_{Y2}$ | 0 . . . 0.2 |
| $a_{M2}$ | 0.2 . . . 0.5 |
| $a_{Y3}$ | 0.4 . . . 0.7 |
| $a_{C1}$, $a_{M1}$, $a_{Y1}$ | 0.9 . . . 1.1 |

As the result of the nonlinear weighting, the deviations are distorted. It is therefore not possible to obtain accurate information concerning the absolute measure of the deviation.

In the case of a full tone deviation, the greatest deviation of the surface coverage is obtained at approximately 50–70%. The partial weight $G_1$ has its center of gravity also at approximately 50% surface coverage. $G_1$ therefore effects a dynamic compression of the deviations at smaller and greater surface coverages. If, for example, the trapezoid function of $G_1$ is selected to be broad enough, only slight distortions of the absolute deviations are obtained.

The situation is different in the case of the partial weights $G_2$ and $G_3$. They distort the deviations as a consequence of environmental and foreign effects and are difficult to calculate. If it is desired not to distort the measured magnitude of the deviations by assigning excessive weights, the partial weights must be made either 0 or 1. If, for example, $G_2$ or $G_3$ exceeds a certain predetermined value, they are assigned a value of 1; below that predetermined value they are made equal to 0. With this digital weighting system, the calculated relative deviation of surface coverage is to some extent proportional to a change in the full tone density.

There is less distortion in the deviations using this weighting system. However, in certain extreme cases of printing masters there exists the risk that all of the weights of a particular zone may become 0.

For 5- and 6- color printing an additional scanning device must be applied in front of and behind the printing mechanisms of each of the fifth and sixth colors. By measuring in front of and behind each printing mechanism, it is possible to measure the contribution of a particular color printed, and to determine the deviation from the reference value accordingly.

Special colors are often printed in full tone without overprinting. For this case the surface coverage-dependent partial weight $G_1$ for median and full tone must be made 1. The partial $G_3$, which is dependent on foreign colors, is made 0 for each image element having any foreign color surface coverage, no matter how slight. This ensures that only pure colors are measured.

According to the foregoing, the reference values of the surface coverages are obtained from a reference in the form of one (or several) OK sheets. This procedure, however, is not absolutely necessary; other references may be used. One alternative, for example, is to use the printing plates themselves as references. The individual printing plates are divided into image elements in the same manner as are the printed products to be examined. The image elements are scanned photoelectrically, and for each image element the surface coverage is determined. Two possibilities then exist for further processing. In one method, the measured surface coverages of every image element of each printing plate are converted to the corresponding surface coverages in print by means of the printing characteristic of the particular printing machine being used (empirically, by tables), then are used directly as the reference surface coverages for comparison with the actual surface coverages. In the other method, the surface coverages measured are converted into reflectance values with the aid of the printing characteristic, which reflectance values are subsequently demasked as described earlier, and converted into reference surface coverages in the process. In the latter method, the reference is synthesized, as it were, from the printing plates.

Figure 2:
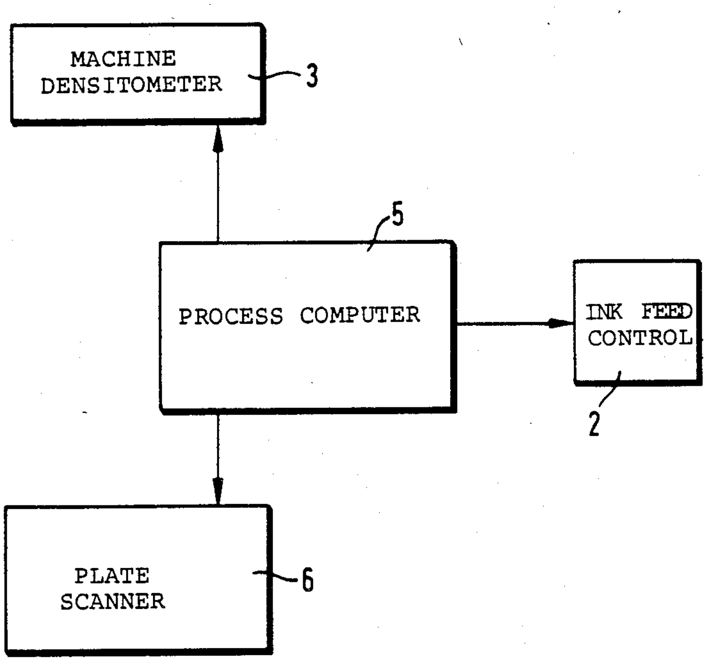
FIG. 2 is a block diagram of another embodiment of the present invention.

FIG. 2 shows a block diagram of an installation of a second embodiment of the present invention, using one of the latter two variants. The process computer 5 is connected, as in FIG. 1, With the aforementioned machine densitometer 3, as well as to an ink feed control 2 of the printin9 machine. In addition, a plate scanner 6 is connected to the process computer 5. The plate scanner 6 is of a conventional design as shown, for example, in U.S. Pat. Nos. 4,131,879 and 3,958,509; or EP-Publ. Nos. 69572, 96227 and 29561, and scans individual printing plates photoelectrically, point by point. The scanning points (spots) may either coincide with the image, or preferably may be made appreciably smaller. In the latter case, the surface coverages of the individual image elements may be determined with a greater resolution and thus with greater accuracy and reliability. Details concerning the predetermination of reflectances or surface densities from printing plates may be found in the co-pending U.S. application Ser. No. 665,976, filed Oct. 29, 1984, (corresponding to Swiss application No. 5965/83 of Nov. 4, 1983).

The printing process thus may be controlled in accordance with the above by using a reference in the form of printing plates, or even by using the halftone films or the like which are masters for the plates. But a mixed operation is also possible; i.e., during the startup of the printing process, control is effected by using the printing plates until a satisfactory quality is attained. Then the continuous or ongoing printing process is based on an OK sheet. In the ideal case the OK sheet coincides with the "synthesized" reference precalculated from the printing plate, so that special measurements of the OK sheets can be eliminated.

The principles, preferred embodiments, and modes of operation of the present invention have been described in the foregoing specification. The invention which is intended to be protected herein, however, is not to be construed as limited to the particular forms disclosed, since these are to be regarded as illustrative, rather than restrictive. Variations and changes may be made by those skilled in the art without departing from the spirit of the invention.

What is claimed is:

1. A process for evaluating printing quality and for regulating ink feed controls in an offset printing machine by photoelectric measurement, by image elements, of both the printed products and a reference, in which the comparison, by image elements, of the printed products to the reference is the basis for the determination of a quality measure and of setting values for the ink feed control elements, comprising the steps of: dividing a reference for the individual printing colors into a plurality of image elements, and for each image element, determining the reference surface coverage for the individual printing colors, the reference being in the form of at least one of a printing plate upon which the printing process is based, and a printed product which has previously been determined to be satisfactory, assigning to each image element, for each printing color, a weighting factor indicating a measure of the assurance with which the prevailing surface coverage may be determined, dividing the printed product into image elements in the same manner as is the reference, measuring the reflectance for each printed product image element, calculating the actual surface coverage for each of the printing colors from the respective reflectances, determining, for each image element and the individual printing colors, deviations of the actual surface coverages from the reference coverages, weighting the deviations with the assigned weighting factors, and determining at least one of the quality measure, and the setting values for the ink feed control elements, from said weighted deviations.

2. A process according to claim 1, wherein the step of calculating surface coverages from reflectances is effected by the iterative resolution of Neugebauer equations.

3. A process according to claim 1, wherein the surface areas of the image elements range from approximately 0.25 $mm^2$ to $400mm^2$.

4. A process according to claim 3, wherein the surface areas of the image elements range from approximately 1 $mm^2$ to 100 $mm^2$.

5. A process according to claim 1, wherein a plurality of image elements define a printing zone, and further comprising the step of: combining the weighted deviations into zonally weighted deviations, which further includes the steps of summing the weighted deviations to yield zonal sums for each zone, and standardizing the zonal sums.

6. A process according to claim 5, wherein zonally weighted setting values for the ink feed control elements are determined from said zonally weighted deviations.

7. A process according to claim 5, wherein the step of calculating surface coverages from reflectances is effected by the iterative resolution of Neugebauer equations.

8. A process according to claim 7, wherein the surface areas of the image elements range from approximately 0.25 $mm^2$ to 400 $mm^2$.

9. A process according to claim 8, wherein the surface areas of the image elements range from approximately 1 $mm^2$ to 100 $mm^2$.

10. A process according to claim 7, further comprising the steps of: determining the coordinates in the color space from the surface coverages for each image element, determining the deviations of the coordinates of the reference from those of the printed product to be evaluated, weighting said deviations of the coordinates with weights determined individually for each image element so that their impact upon the visual appearance of the product is reflected, and establishing a quality measure for changing the visual aspect of the image as a result of the deviations so weighted.

11. A process according to claim 10, further comprising the steps of: in the case of a reference based upon a printed product previously found to be satisfactory, for each image element of said product, measuring the reflectances in the printing colors, and calculating the reference surface coverages from said reflectances in the same manner as is done for the printed products to be evaluated.

12. A process according to claim 10, further comprising the steps of: in the case of a reference based upon printing plates, measuring the surface coverages for each of the image elements of the plates, converting the surface coverages so measured into corresponding surface coverages in print by means of the printing characteristic of the printing machine, and utilizing said surface coverages in print directly as reference surface coverages.

13. A process according to claim 10, further comprising the steps of: in the case of a reference based upon printing plates, for each of the image elements, measuring the surface coverages, converting the measured surface coverages into reference reflectances to be expected in print, by means of the printing characteristic of the printing machine, and calculating the reference surface coverages from said reference reflectances in the same manner as is done for the printed products to be evaluated.

14. A process according to claim 5, wherein zonally weighted setting values for the ink feed control elements are determined from said zonally weighted deviations.

15. A process according to claim 5, wherein the weighting factor for each of the image elements, for each printing color, is determined as a function of the surface coverage, of a foreign color component, and of the environment of a respective image element.

16. A process according to claim 15, wherein the step of determining the weighting factor of each of the image elements for each printing color is determined by combining three partial weights, which steps of combining further includes the steps of determining a first partial weight from the surface coverage, determining a second partial weight from the foreign color component, and determining a third partial weight from the surrounding environment of a respective image element.

17. A process according to claim 16, wherein the partial weight determined from the surface coverage is selected so that it is at its maximum value in the case of medium surface coverages, and is at lower values in the cases of smaller or greater surface coverages.

18. A process according to claim 17, wherein the partial weight determined from the environment is selected so that it increases in value with the increasing homogeneity of surface coverage in the environment of a respective image element.

19. A process according to claim 17, wherein the partial weight determined from the foreign color component is selected so that its value increases as the surface coverages of foreign colors decrease.

20. A process according to claim 16, wherein the partial weight determined from the environment is selected so that it increases in value with the increasing homogeneity of surface coverage in the environment of a respective image element.

21. A process according to claim 20, wherein the partial weight determined from the foreign color component is selected so that its value increases as the surface coverages of foreign colors decrease.

22. A process according to claim 16, wherein the partial weight determined from the foreign component is selected so that its value increases as the surface coverages of foreign colors decrease.

23. A process according to claim 1, further comprising the steps of: determining the coordinates in the color space from the surface coverages for each image element, determining the deviations of the coordinates of the reference from those of the printed product to be evaluated, weighting said deviations of the coordinates with weights determined individually for each image element so that their impact upon the visual appearance of the product is reflected, and establishing a quality measure for changing the visual aspect of the image as a result of the deviations so weighted.

24. A process according to claim 1, further comprising the steps of: in the case of a reference based upon a printed product previously found to be satisfactory, for each image element of said product, measuring reflectances of the printing colors, and calculating the reference surface coverages from said reflectances in the same manner as is done for the printed products to be evaluated.

25. A process according to claim 1, further comprising the steps of: in the case of a reference based upon printing plates, measuring the surface coverages for each of the image elements of the plates, converting the surface coverages so measured into corresponding surface coverages in print by means of the printing characteristic of the printing machine, and utilizing said surface coverages in print directly as reference surface coverages.

26. A process according to claim 1, further comprising the steps of: in the case of a reference based upon printing plates, for each of the image elements, measuring the surface coverages, converting the measured surface coverages into reference reflectances to be expected in print, by means of the printing characteristic of the printing machine, and calculating the reference surface coverage from said reference reflectances in the same manner as is done for the printed products to be evaluated.

27. A process according to claim 1, wherein the weighting factor for each of the image elements, for each printing color, is determined as a function of the surface coverage, of a foreign color component, and of the environment of a respective image element.

28. A process according to claim 27, wherein the step of determining the weighting factor of each of the image elements for each printing color is determined by combining three partial weights, which step of combining further includes the steps of determining a first partial weight from the surface coverage, determining a second partial weight from the foreign color component, and determining a third partial weight from the environment of a respective image element.

29. A process according to claim 28, wherein the partial weight determined from the surface coverage is selected so that it is at its maximum value in the case of medium surface coverages, and is at lower values in the cases of smaller or greater surface coverages.

30. A process according to claim 29, wherein the partial weight determined from the environment is selected so that it increases in value with the increasing homogeneity of surface coverage in the environment of a respective image element.

31. A process according to claim 29, wherein the partial weight determined from the foreign color component is selected so that its value increases as the surface coverages of foreign colors decrease.

32. A process according to claim 28, wherein the partial weight determined from the environment is selected so that it increases in value with increasing homogeneity of surface coverage in the environment of a respective image element.

33. A process according to claim 32, wherein the partial weight determined from the foreign color component is selected so that its value increases as the surface coverages of foreign colors decrease.

34. A process according to claim 28, wherein the partial weight determined from the foreign component is selected so that its value increases as the surface coverages of foreign colors decrease.

35. A process according to claim 28, further comprising the steps of: determining the coordinates in the color space from the surface coverages for each image element, determining the deviations of the coordinates of the reference from those of the printed product to be evaluated, weighting said deviations of the coordinates with weights determined individually for each image element so that their impact upon the visual appearance of the product is reflected, and establishing a quality measure for changing the visual aspect of the image as a result of the deviations so weighted.

36. A process according to claim 35, further comprising the steps of: in the case of a reference based upon a printed product previously found to be satisfactory, for each image element of said product, measuring the reflectances of the printing colors, and calculating the reference surface coverages from said reflectances in the same manner as is done for the printed products to be evaluated.

37. A process according to claim 35, further comprising the steps of: in the case of a reference based upon printing plates, measuring the surface coverages for each of the image elements of the plates, converting the surface coverages so measured into corresponding surface coverages in print by means of the printing characteristic of the printing machine, and utilizing said surface coverages in print directly as reference surface coverages.

38. A process according to claim 35, further comprising the steps of: in the case of a reference based upon printing plates, for each of the image elements, measuring the surface coverages, converting the measured surface coverages into reference reflectances to be expected in print, by means of the printing characteristic of the printing machine, and calculating the reference surface coverages from said reference reflectances in the same manner as is done for the printed products to be evaluated.

39. An apparatus for evaluating printing quality and regulating ink feed controls in an offset printing machine having a photoelectric scanning device for scanning the printed product while the printing machine is running, comprising: an electronic system for controlling the scanning device and for evaluating the measured data produced by the scanning device, taking into account at least one of a quality measure, and setting values for the ink feed control elements of the printing machine, the electronic system further including means for converting reflectances detected by the scanning device into surface coverages, means for determining weighting factors from the surface coverages so converted, means for determining the deviations of the surface coverages of the printed products to be evaluated from the surface coverages of a reference product, means for weighting said deviations with weighting factors, and means for summing the weighted deviations, by zones, into at least one of a zone-specific quality measure, and a setting value to regulate a respective ink feed control element of the printing machine.

40. An apparatus according to claim 39, further comprising: means operatively connected to the electronic system for photoelectrically scanning the printing plates by areas, and for determining the surface coverages, by image elements, of said printing plates.

41. An offset printing machine having an automatic regulating device for regulating ink feed control elements, comprising: a photoelectric scanning device for scanning the printed product while the printing machine is running, an electronic system for controlling the scanning device and for evaluating the measured data produced by the scanning device taking into account at least one of a quality measure and setting values for the ink feed control elements of the printing machine, the electronic system further including means for converting reflectances detected by the scanning device into surface coverages, means for determining weighting factors from the surface coverage so converted, means for determining the deviations of the surface coverages of the printed products to be evaluated from the surface coverages of a reference product, means for weighting said deviations with weighting factors, and means for summing the weighted deviations, by zones, into zone-specific setting values to regulate the ink feed control elements of the printing machine.

42. An offset printing machine according to claim 41, further comprising: means operatively connected to the electronic system for photoelectrically scanning the printing plates by areas and for determining the surface coverages, by image elements, of said printing plates.

* * * * *